US00RE34538E

United States Patent [19]

Agethen et al.

[11] E Patent Number: Re. 34,538

[45] Reissued Date of Patent: Feb. 8, 1994

[54] GLAZING LAMINATES

[75] Inventors: Heinrich Agethen; Paul Gesenhues, both of Herdecke; Helmer Rädisch, Aachen; Otto Jandeleit, Alsdorf; Wolfgang Schäfer, Aachen, all of Fed. Rep. of Germany

[73] Assignee: Saint-Gobain Vitrage, Paris, France

[21] Appl. No.: 696,846

[22] Filed: May 7, 1991

Related U.S. Patent Documents

Reissue of:

[64] Patent No.: 4,925,734
Issued: May 15, 1990
Appl. No.: 191,785
Filed: May 4, 1988

U.S. Applications:

[63] Continuation of Ser. No. 844,882, Mar. 27, 1986, abandoned, which is a continuation of Ser. No. 659,025, Oct. 9, 1984, Pat. No. 4,643,944, which is a continuation of Ser. No. 274,547, Jun. 17, 1981, abandoned, which is a continuation of Ser. No. 190,341, Sep. 24, 1980, abandoned, which is a continuation of Ser. No. 70,732, Aug. 29, 1979, abandoned, which is a continuation of Ser. No. 811,430, Jun. 29, 1977, abandoned.

[30] Foreign Application Priority Data

Jul. 2, 1976 [DE] Fed. Rep. of Germany ..... 2629779

[51] Int. Cl.[5] ..... B32B 27/00

[52] U.S. Cl. ..... 428/349; 428/423.3; 428/425.6; 428/906; 428/912; 156/99; 156/313; 156/106; 156/315

[58] Field of Search ..... 428/349, 423.3, 425.6, 428/906, 912; 156/99, 313, 106, 315

[56] References Cited

U.S. PATENT DOCUMENTS 3,808,077 4/1974 Rieser et al. ..... 156/99
4,218,500 8/1980 Rädisch ..... 428/423.3
4,643,944 2/1987 Agethen et al. ..... 428/349

FOREIGN PATENT DOCUMENTS 1394271 5/1975 United Kingdom ..... 156/99

*Primary Examiner*—Edith Buffalow
*Attorney, Agent, or Firm*—Oblon, Spivak, McClelland, Maier & Neustadt

[57] ABSTRACT

An integument which contributes to the maintenance of surface integrity is disclosed, particularly a sheet for use in preparing laminates, such as vehicle windshields, in which an energy absorbing ply, for example, a ply of poly(vinyl butyral), is sandwiched between two glass plies, the sheet of this invention being applied to an exposed surface of one of the glass plies and having one surface layer comprising a thermoplastic polyurethane capable of adhering to a glass or plastic substrate and the other surface layer comprising a thermoset polyurethane having antilacerative, self-healing and anti-ablative properties; there is further disclosed the manufacture and application of such a sheet as a ply facing the interior of a vehicle, thereby forming a windshield the inwardly exposed surface of which comprises a thermoset polyurethane which protects the vehicle occupants from facial lacerations caused by windshield impact and which has self-healing properties.

11 Claims, 1 Drawing Sheet

GLAZING LAMINATES

Matter enclosed in heavy brackets [ ] appears in the original patent but forms no part of this reissue specification; matter printed in italics indicates the additions made by reissue.

This application is a continuation of Ser. No. 844,882, filed Mar. 27, 1986, now abandoned, which is a continuation of Ser. No. 659,025, filed Oct. 9, 1984, now U.S. Pat. No. 4,643,944, which is a continuation of Ser. No. 274,547, filed June 17, 1981, now abandoned, which is a continuation of Ser. No. 190,341, filed Sept. 24, 1980, now abandoned, which is continuation of Ser. No. 070,732, filed Aug. 29, 1979, now abandoned, which is a continuation of Ser. No. 811,430, filed June 29, 1977, now abandoned.

FIELD OF THE INVENTION

This invention relates to articles of manufacturer useful in the assembledge of plural laminate structures, particularly glazing laminate that is, plural-ply transparent or translucent glass and/or plastic articles, such as, for example, windshields, vehicle sides windows, building lights, eye glasses of various types, including safety and sun glasses, visors and lenses. In addition, this invention relates to the method of producing the articles of manufacture according to this invention, to the composition of which such articles are composed to the production of laminates from said articles. Since the invention is particularly advantageously embodied in vehicle windshields, the invention is hereafter described in connection with and as an improvement in laminated windshields of the type now widely used. It should be understood that the invention can be utilized in applications involving other types of laminates, as will be described in detail below.

The type of laminated windshield used most widely in automobiles at the present time comprises a sheet of poly(vinyl butyral), a high energy-absorbing material, sandwiched between and adhered to two plies of glass. Improvements to windshields of this type are described in French Patent No. 2,187,719 and U.S. Pat. No. 3,979,548 to Schafer and Radisch, each assigned to the same assignee as the present invention. These patents disclose the application t the inner surface of the glass ply of a plastic material, for example, a crosslinked or thermoset polyurethane which imparts to the windshield important and highly desired properties.

Upon impact by the head of an occupant, the plastic material resists tearing and protects the occupant from being cut by the shattere edges of the inner glass ply. Further, the occupant is protected from being cut by flying splinters of glass in the event of impact from outside the vehicle against the exterior of the windshield, for example, by a stone thrown accidentally by the tire of another vehicle. More succinctly, the plastic material has anti-lacerative properties. In addition, the plastic material has autorestorative or self-healing properties, in that surface deformation such as local indentations tend to heal or disappear relatively quickly, often even within several minutes or somewhat longer, depending on the nature of the indentation and the temperature of the plastic material. Such characteristics of the thermoset polyurethane apparently result from a type of solid state plastic memory.

Another important characteristic of the polyurethane plastic sheet material is that it is sufficiently yielding so that it does not cause appreciable impact injury to the human head when a collision causes an individual to strike the windshield.

This invention relates to improved means by which a thermoset plastic material of the aforementioned type is adhered to a glass substrate or to a plastic substrate in a laminate such as, for example, a windshield, including the type described above.

REPORTED DEVELOPMENT

Various ways have been proposed to adhere thermoset plastic materials of the aforementioned type to glass substrates. As will be seen from the discussion which follows, various problems have been encountered with adhering methods heretofore proposed.

Aforementioned French Patent No. 2,187,719 discloses that the adhesive properties of crosslinked polyurethanes (hereafter referred to as "thermoset polyurethanes" for convenience) which have anti-lacerative and self-healing properties are such that a sheet of this plastic material can be bonded to glass without the use of an adhesive, but experience has shown that certain polyurethanes of this type, including polyurethanes described in aforementioned U.S. Pat. No. 3,979,548, do not adhere well to glass over extended periods of time and that the bond between the thermoset polyurethane and the glass is weakened when exposed to moisture. By way of example, it is noted that when a monomeric liquid mixture which forms a thermoset polyurethane of the type described in said U.S. Pat. No. 3,979,548 is cast directly onto a glass surface, the resulting thermoset sheet exhibits excellent initial adhesion to the glass, but the bond is weakened when the glass/plastic laminate is subjected to moisture.

It is noted further that when a monomeric liquid mixture is cast directly onto a curved substrate, for example, a curved glass ply of a windshield, it is virtually impossible to form a film having a uniform thickness. A film which is not uniform in thickness leads to optical defects io the glazing laminate and other undesirable problems.

Aforementioned French Patent No. 2,187,719 discloses also that the thermoset polyurethane can be made in the form of a sheet which is adhered to the glass substrate by an adhesive. Various techniques to effect this type of bonding method lead to problems. For example, when using a liquid solution of an adhesive material dissolved in solvent, substantial difficulties are encountered in removing one solvent after the sheet and substrate have been brought together. This applies with respect to any type of bonding method utilizing a liquid adhesive which contains an ingredient which must eventually be removed.

In general, when using any type of liquid adhesive, even those which do not contain a solvent or other material which must be removed, it is difficult to form a film of the adhesive of uniform thickness, even when the substrate is flat. (As mentioned above, casting a uniform liquid film on a curved substrate is virtually impossible.) Moreover, even when a adhesive film of uniform thickness is initially formed, portions are apt to be spread and rendered uneven when the thermoset sheet is applied to the film on the glass substrate. Very small differences in the thickness of the adhesive layer, even those which are scarcely visible, can cause substantial optical defects in the laminate such as streaks which create optical distortions and therefore adversely affect the view through the windshield. For windshields which require particularly good optical qualities, such defects can render them unacceptable.

Although U.S. Pat. No. 3,960,627 discloses that a thermoset sheet of the aforementioned type can be first coated with a coating which is rendered adhesive in character by the use of heat and/or pressure, there is no disclosure in the patent respecting the composition or character of coatings to be used. It is an object of the present invention to provide improved techniques for laminating a thermoset plastic sheet to a glass or plastic ply and to provide an improved adhesive composition for effecting the lamination.

SUMMARY OF THE INVENTION

In accordance with this invention, there is provided a pre-formed sheet for use in preparing a laminate, such as windshield or other glazing laminate, the surface layer at one side of said sheet comprising a thermoplastic material housing limited cross-linking capable of adhering to a ply of said laminate, and the surface layer at the other side of said sheet comprising a thermoset material having a high degree of cross-linking which, for example, has anti-lacerative and self-healing properties, or the thermoset material may be of a type which imparts other desired properties to the laminate.

The pre-formed sheet is formed independently of the laminate which is formed subsequently from the sheet and one or more of the other plies comprising the laminate. The term "sheet" as used herein includes within its meaning a composite of the thermoplastic and thermoset materials of indefinite length and also composite pieces, for example, pieces of the general size and shape of the glazing laminate incorporating the composite.

In preferred form, the invention provides a preformed multilayer sheet, one surface layer of which is a thermoplastic polyurethane capable of adhering to glass or plastic, for example, polycarbonate, and the other surface layer of which comprises thermoset polyurethane having anti-lacerative and self-healing properties.

Other aspects of the invention, including preferred materials comprising the sheet, preparation of the sheet and the application of the sheet to a ply or substrate comprising a glazing laminate are described in detail below. It is noted further that a very important aspect of the present invention is the provision of a thermoplastic adhesive, described in detail below, which has excellent optical qualities and other properties which facilitate manufacturing and handling of the sheet of the present invention and also fabrication of glazing laminates comprising the sheet.

DETAILED DESCRIPTION OF THE INVENTION

Figure 1:
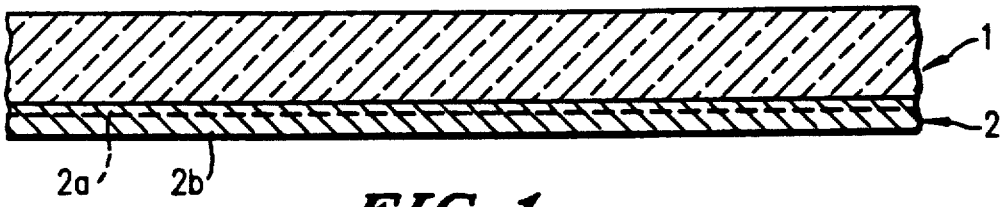
FIG. 1 is a cross-sectional view of a glazing laminate prepared from a pre-formed sheet of the present invention.

In a preferred embodiment, the sheet of the present invention comprises: (A) a film of polyurethane of three-dimensional network, that is, a crosslinked or thermoset polyurethane, having self-healing and anti-lacerative properties, and joined thereto (B) a film of polyurethane of linear chains, that is, a thermoplastic polyurethane, having the ability to adhere to glass or plastic, for example, polycarbonate. The films of thermoplastic and thermoset polyurethane can be joined by physical surface adhesion or, as will be described in detail below, the joining of the films can include chemical bonding.

In preferred form, the surface of the thermoplastic film, as well as that of the thermoset film, is substantially non-tacky at room temperature (for example, about 15° C. to 35° C.) that is, at temperatures likely to be encountered in a facility in which the sheet is manufactured, stored, and/or used in preparing a glazing laminate. At temperature in excess of about 35° C., the thermoplastic material is softened to the extent that when the sheet is pressed to a glass or plastic substrate, the thermoplastic material is capable of flowing and adhering to the substrate to an extent that the sheet does not slip or slide on the surface of the substrate. In this preferred form, important processing advantages are realized as will be described below As to exemplary thickness of the films comprising the sheet of the invention, the film of thermoset material can have a thickness of about 0.2 to about 0.8 mm, and preferably from about 0.4 mm to about 0.6 mm, and the thermoplastic film can have a thickness of about 0.01 to about 0.8 mm, and preferably about 0.02 to about 0.6 mm. Accordingly, the thickness of the sheet can be, for example, about 0.21 mm to about 1.6 mm. Sheets having film thicknesses within the aforementioned ranges have been used to excellent advantage in preparing windshields of the type in which an energy absorbing sheet such as poly(vinyl butyral) is sandwiched between two glass plies. It should be understood that for other applications, each of the films may have a thickness outside of the aforementioned ranges, including a thickness in excess of 1 mm.

The following are exemplary monomers that can be used to prepare the thermoset polyurethane: aliphatic bifunctional isocyanates such as 1,6-hexanediisocyanate, 2,2,4- and 2,4,4-trimethyl-1,6-hexanediisocyanate, 1,3-bis(isocyanatomethyl)benzene, bis(4isocyanatocyclohexyl)methane, bis(3-methyl-4isocyanatocyclohexyl)methane, 2,2-bis(4-isocyanatocyclohexyl)propane, and 3-isocyanatomethyl-3,5,5-trimethylcyclohexylisocyanate, or their tri- or higher functional biurets, isocyanurates, and prepolymers thereof; and polyfunctional polyols such as branched polyols, for example, polyesters or polyether polyols obtained by the reaction of polyfunctional alcohols such as, for example, 1,2,3-propane triol (glycerol), 2,2-bis(hydroxymethyl)1-propanol (trimethylol ethane), 2,2-bis (hydroxymethyl)1-butanol (trimethylol propane), 1,2,4-butane triol, 1,2,6-hexane triol, 2,2-bis(hydroxymethyl)1,3propane diol (pentaerythritol) 1,2,3,4,5,6-hexane hexol (sorbitol), with aliphatic diacids such as, for example, malonic acid, succinic acid, glutaric acid, adipic acid, suberic acid, sebacic acid or with cyclic ethers, such as, for example, ethylene oxide, 1,2-propylene oxide, and tetrahydrofuran. The molecular weights of the branched polyols desirably fall within the range of about 450 to about 4000, and preferably about 450 to about 2000. Mixtures of different polyisocyanate and polyol monomers can be used. A particularly preferred thermoset polyurethane is described in aforementioned U.S. Pat. No. 3,979,548.

The thermoplastic polymer for use in preparing the sheet of the present invention is preferably a polyurethane which, instead of being prepared from monomers which form a three-dimensional crosslinked network, react to form linear chains of macromolecules. Exemplary diols that can be used are aliphatic polyesters such as those formed from one or more diacids, such as, for example, malonic acid, succinic acid, glutaric acid, adipic acid, suberic acid and sebacic acid and diols such as, for example, 1,2-ethanediol (ethylene glycol), 1,2-propanediol, 1,3-propanediol, 1,2-butanediol, 1,3-butanediol, 1,4-butanediol, 2,2-dimethyl-1,3-propanediol (neopentyl glycol), 1,6-hexanediol, 2-methyl-2,4-pentanediol, 3-methyl-2,4-pentanediol, 2-ethyl-1,3-hexanediol, 2,2,4-trimethyl-1,3-pentanediol, diethylene glycol, triethylene glycol, polyethyleneglycols, dipropylene glycol, tripropylene glycol, polypropylene glycols or 2,2-bis(4-hydroxycyclohexyl)propane and mixtures thereof. In preparing the polyester diol, the addition of lactones, such as a gamma-butyrolactone, gamma-valerolactone, delta-valerolactone and epsilon-caprolactone, can be useful. The molecular weight of the polyester is desirably within the range of about 500 to about 4000, and preferably about 1000 to about 2000.

The thermoplastic polyurethane can also be prepared from linear polyethers having a molecular weight within the aforementioned ranges and prepared from the following exemplary compounds: ethylene oxide, 1,2-propylene oxide and tetrahydrofuran.

Examples of difunctional aliphatic isocyanates which can be reacted with the aforementioned diols (the polyesters and/or polyethers) to produce the thermoplastic polyurethanes are: 1,6-hexanediisocyanate, 2,2,4- and 2,4,4-trimethyl-1,6-hexane-diisocyanate, 1,3-bis-(isocyanatomethyl)benzene, bis(4-isocyanatocyclohexyl)methane, bis (3-methyl-4-isocyanatocyclohexyl)methane, 2,2-bis(4-isocyanatocyclohexyl)propane, and 3-isocyanatomethyl-3,5,5-trimethylcyclohexylisocyanate.

Turning now to the drawings, and first to FIG. 1, there is shown therein a glazing laminate within the scope of the present incention and prepared from a pre-formed sheet of the present invention. The safety glazing laminate of FIG. 1 comprises a glass sheet 1, for example, ordinary silicate glass such as made by the float process, or tempered or chemically toughened silicate glass, and a pre-formed plastic sheet 2 adhered to glass sheet 1 by the thermoplastic polyurethane adhesive layer 2a of pre-formed plastic sheet 2. Adhesive layer 2a forms a firm, long-lasting bond with the surface of glass sheet 1 by the use of heat and pressure. The thermoplastic polyurethane adhesive layer 2a, which has a thickness of about 0.05 mm is joined to the thermoset polyurethane layer 2b, which has a thickness of about 0.5 mm, and which has properties which permit it to undergo large deformations, without plastic deformation even when deflected substantially. Thermoset polyurethane layer 2b has self-healing and anti-lacerative properties. Accordingly, plastic sheet 2 prevents contact with sharp edges of pieces of glass upon the breakage of glass sheet 1. An exemplary use of the glazing laminate shown in FIG. 1 is eye piece, for example, in goggles, safety or sun glasses, and visors.

Figure 2:
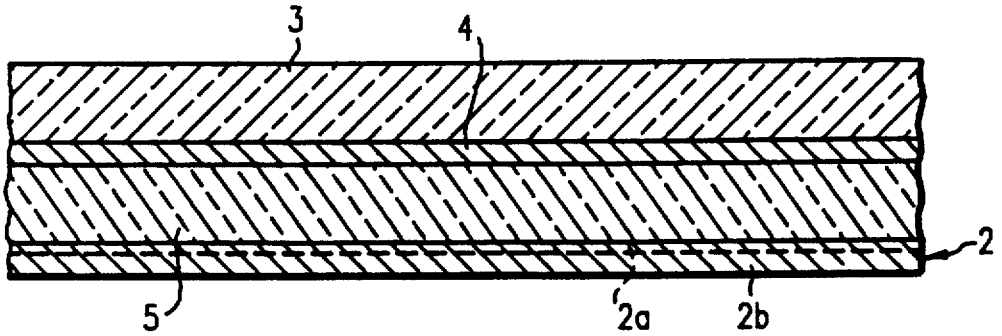
FIG. 2 is a cross-sectional view of another type of glazing laminate prepared from a pre-formed sheet of the present invention.

Turning now to FIG. 2, there is shown therein a glazing laminate incorporating a pre-formed sheet if the present invention and a laminate which can be used as a windshield. The pre-formed plastic sheet 2 is of the same type as the plastic sheet 2 of FIG. 1. It is adhered to the glass sheet 5 which in turn is adhered to glass sheet 3 by plastic inter-layer 4, for example, poly(vinyl butyral), which functions also as an energy absorber. In effect, FIG. 2 shows the use of the sheet of the present invention to modify and improve laminated windshields of the type now widely used.

Plastic sheet 2 can be adhered to the surface of glass sheet 5 in the same laminating step used to join glass sheets 3 and 5 and inter-layer 4. Alternatively, plastic sheet 2 can be adhered to glass sheet 5 in a separate process step.

The glazing laminates of FIGS. 1 and 2 show the sheet of the present invention adhered to a glass ply of the laminate. Glazing laminates in which the sheet of the present invention is adhered to a plastic ply can be prepared also. Examples of plastics which can be used are polycarbonates, polyacrylics, poly(vinyl chloride), polystyrene and cellulose esters, for example, the acetic, propionic and butyric esters.

In preparing a glazing laminate from a pre-formed sheet of the present invention, the thermoplastic side of the sheet is applied to a glass or plastic substrate or ply of the laminate and adhered thereto under suitable conditions, for examples by the use of heat and/or pressure. Apparatus and techniques of the type described in U.S. Pat. Nos. 3,806,387 and 3,960,627 and in German Patent No. 2,424,085 and in published German Patent Application DT-OS 2,531,501 can be used.

In preferred form, a sheet having a non-tacky thermoplastic surface at room temperature is pressed onto a substrate or laminate ply which has been heated to a moderately elevated temperature (for example, about 50° C. to about 80° C.), at which the thermoplastic material softens, flows and adheres to the extent that the sheet does not slip o slide from the surface of the substrate or ply, even when handled at room temperature. Exemplary pressure that can be used are about 0.5 to about 2 bars above atmospheric pressure. Bonds so formed from thermoplastic materials within the scope of the present invention are sufficiently firm to permit satisfactory handling of the laminate and they can be made still firmer and stronger by subjecting the laminate to higher temperatures and pressures. This can be effected in an autoclave, for example, at temperatures and pressures within the ranges respective of about 100° C. to about 140° C. and about 3 to about 15 bars above atmospheric pressure, depending on the nature of the materials comprising the piles of the laminate.

A number of processing advantages are realized by the provision of a sheet which has a non-tacky surface at room temperature. Such a sheet can be rolled, stored and handled conveniently when there is a lapse of time between the formation of the sheet and its use in forming the glazing laminate.

Another highly important advantage of such a sheet is that dust and other foreign particles and materials do not tightly adhere to the non-tacky surface and can be removed readily therefrom. The presence of undue amounts of such foreign materials tends to create optical defects in the glazing laminate and to render the laminate unsatisfactory for use in applications where the optical standards of the laminate are high. Such problems are greatly mitigated by the provision of a sheet having a non-tacky surface at room temperature.

It is noted also that the thermoplastic layer upon being heated has the ability, in contrast to a thermoset layer, to absorb dust particles and other foreign materials on its surface or the surface to which it is adhered. In effect, such materials are embedded within the thermoplastic layer. This reduces the tendency of such foreign materials to cause optical defects in the laminate. With a thermoset surface, dust particles and the like are not absorbed, but they are adsorbed on the surface which they distort, thereby forming in the laminate lenses which create optical distortions.

Operating advantages are also realized by the provision of a thermoplastic resinous layer which at moderately elevated temperatures adheres well enough to the glass or plastic surface to permit the laminate to be safely handled and stored. Thus, when there is a lapse of time between the application of the sheet to the glass or plastic surface and final and firmer bonding in an autoclave, the laminate can be safely transported and handled.

The pre-formed sheet of the present invention can be formed in various ways. A mixture of the liquid monomers from which the thermoset material is formed can be cast onto a solid film of the thermoplastic adhesive material and polymerized to form a solid thermoset layer adhered to the underlying thermoplastic film. The sheet of thermoplastic adhesive material can be formed in any suitable way, for example, by a casting or extrusion operation.

The pre-formed sheet can also be prepared by casting monomeric mixtures of the reactants which form the respective thermoset and thermoplastic materials one on top of the other at appropriate time intervals, and onto a suitable substrate, including a glass substrate, coated with a release agent if necessary.

The following method has been used advantageously in forming a pre-formed sheet according to the present invention. A monomeric mixture of the reactants which form the desired thermoset polyurethane are cast onto a moving glass support, coated with a release agent, by a casting head having a narrow elongated slot. Preferred apparatus for use in such a casting operation is described in U.S. Patent application Ser. No. 783,343, filed Mar. 31, 1977, the disclosure of which is incorporated herein by reference. After the monomers have polymerized (accelerated by heat) to form a solid thermoset polyurethane film, a solution comprising the thermoplastic polyurethane dissolved in a suitable solvent is cast in a similar manner onto the previously formed film of thermoset polyurethane. As the solvent is evaporated, aided by heat, there is formed a solid film of the thermoplastic polyurethane firmly bonded to the underlying thermoset film.

A modified form of this method includes casting a solvent-free monomeric mixture of the reactants which form the thermoplastic film onto the film of thermoset polyurethane. This method advantageous in that a solvent removal step is avoided.

On the other hand, the method which includes the use of a solution of resin dissolved in solvent generally permits the user to exercise better control over the resin in that it is pre-formed, whereas the reaction of monomers while supported on the thermoset film can result in polyurethanes of different chain lengths. This can lead to the production of films having varying properties.

Any of the aforementioned methods can be utilized to form pre-formed sheets of continuous length.

The nature of the interface between the thermoset and thermoplastic portions of the sheet can vary, depending on how the sheet is made and the constituents used. For example, if a solution of resin dissolved in solvent is applied to a solid film of the thermoset material, the solvent may swell the surface of the thermoset film in which event, the solid thermoplastic film which forms as the solvent evaporates tends to merge with the surface of the thermoset film. If reactive groups are present in the thermoset and thermoplastic materials when they are brought into contact, the bonding of the materials can include chemical bonding at the interface. Also the materials may be joined by physical surface adhesion.

EXAMPLES

Examples which follow are illustrative of the present invention. Each of the examples shows the use of a preferred thermoset polyurethane having anti-lacerative and self-healing properties. Preferred thermoset polyurethanes for use in the practice of the present invention are described in U.S. Pat. No. 3,979,548.

Example No. 1

A thermoset polyurethane of the aforementioned type was prepared from the following monomers which were first degassed by stirring under reduced pressure to avoid the formation of bubbles in the film formed from the polyurethane:

(a) 1,000 g of a polyether having a molecular weight of about 450 and obtained by the condensation of 1,2-propylene oxide with 2,2-bis(hydroxymethyl)1-butanol and having a percentage of free OH groups of about 10.5 to about 12% (for example, the product sold under the trademark DESMOPHEN 550 U of the Bayer AG), and (b) 1000 g of a biuret of 1,6-hexanediisocyanate containing about 21–22% of free NCO groups (for example, the product sold under the trademark DESMODUR N/100 of the Bayer AG). Prior to mixing the monomers, monomer (a) was first mixed with 23 g of an antioxidant, namely, 2,6-di(tert.butyl)4-methylphenol (for example, the product sold under the trademark IONOL by Shell) and 0.5 g of a catalyst, namely, dibutylin dilaurate.

The homogeneous mixture obtained by mixing the aforementioned was cast onto a glass plate coated with a release agent. The monomers polymerized under the influence of heat and formed a solid thermoset polyurethane film having anti-lacerative and self-healing properties.

A thermoplastic polyurethane was formed from the following monomers which were first degassed by stirring under reduced pressure to avoid the formation of air bubbles in the film formed from the polyurethane:

(a) 980 g of a linear polyether having a mean molecular weight of about 2,000 and prepared from 1,2-propane diol and 1,2-propylene oxide and having about 1.6–1.8% of free hydroxyl groups (for example, the product sold under the trademark DESMOPHEN 3,600 by Bayer) and (b) 110 g of 3-isocyanatomethyl-3,5,5-trimethylcyclohexylisocyanate having a content of free NCO groups of about 37.5% and sold under the trademark IPDI by Veba AG.

Prior to mixing the monomers, monomer (a) was first mixed with 4 g of an antioxidant, namely, 2,6-di(tert-.butyl)4-methylphenol (IONOL) and 0.1 g of dibutyltin dilaurate catalyst.

The monomeric mixture was cast onto the previously formed film of thermoset polyurethane and polymerizes thereon to form a film which is solid at room temperature and which adheres tightly to the underlying film of thermoset polyurethane thereby forming a sheet of the present invention. The solid flexible plastic sheet formed from the two joined films of thermoplastic and thermoset polyurethanes was stripped from the underlying glass support and its non-tacky thermoplastic surface was applied to a glass substrate and adhered thereto. This was done by pressing the sheet onto the glass substrate with a rolling pin at room temperature and thereafter placing the laminate in an autoclave for about 1 hour at a temperature of about 135° C. and a pressure of 6 bars above atmospheric pressure. The sheet was firmly and uniformly bonded, the glass and it had excellent transparency properties.

The adherence of bonding of the thermoplastic layer to the thermoset layer of the sheet can include chemical bonding when the monomeric mixture from which the thermoplastic polyurethane is formed is applied to the underlying thermosetting film prior to the time it is fully cured, that is, while there are present free OH and NCO groups for reacting with reactable groups in the monomeric mixture.

The next example shows the preparation and use of a thermoplastic polyurethane different from that shown in Example 1.

Example No. 2

A thermoplastic polyurethane is prepared from the following monomers:

(a) 1,000 g of a linear polyester having a molecular weight of 1,850 and about 1.8–1.9% free OH groups and prepared from 100 parts of adipic acid, 56 parts of 1,6-hexanediol, 30 parts of 2,2-dimethyl-1,3-propanediol and 7 parts of 1,2-propanediol; and (b) 128 g of bis(4-isocyanatocyclohexyl) methane having a content of free NCO groups of about 31.5% (for example, the product sold under the trademark HYLENE W by Dupont).

The monomers along with catalyst and antioxidant as described in Example No. 1, are placed into a reactor and polymerized to form a thermoplastic polyurethane in a nitrogenous atmosphere. The cooled molten mass is granulated and dissolved in demethylformamide to form a 10 wt % solution. This solution is cast onto a thermoset polyurethane resinous film as described in Example 1. The solvent is evaporated, aided by heat, and there is obtained a solid film of thermoplastic polyurethane which adheres tightly to the underlying thermoset polyurethane film, thereby forming a sheet of the present invention.

The next example shows the preparation of still another thermoplastic polyurethane which can be used to advantage in the practice of the present invention.

Example No. 3

The linear thermoplastic polyurethane of this example is prepared in a nitrogenous atmosphere by reacting a polyester and diisocyanates. The polyester is prepared in a reactor by reacting 145 g of adipic acid and 50 g of sebacic acid with 145 g of E-caprolactone, 120 g of 2,2-dimethyl-1,3-propanediol and 80 g of 1,4-butanediol in the presence of 25 g of xylene and 0.25 g of dibutylin dilaurate at a temperature of 180° C. After separating 22.5 g of water from the reaction, there is added 18 g of a chain extender, namely, 1,4-butanediol, along with 400 g of xylene. Thereafter, the temperature is lowered to 80° C. and there are added with vigorous agitation, 150 g of bis(4-isocyanatocyclohexyl)methane and then 50 g of 3-isocyanatomethyl-3,5,5-trimethylcyclohexylisocyanate. After raising the temperature to 100° C., the polymerization is continued until a linear thermoplastic polyurethane resin having a molecular weight of in excess of 40,000–50,000 is obtained. After cooling to about 70° C., the mixture is diluted with about 3,000 g of methylethylketone, and then, at a temperature of about 30° C., with about 3,000 g of tetrahydrofuran to give a solution of about 10% by weight of polyurethane resin.

The solution is cast onto a solid film of thermoset polyurethane as described in Example No. 1. The solvents are evaporated, aided by heat, and a solid thermoplastic polyurethane film adhered to the underlying film of thermoset polyurethane is obtained.

The next example shows the use of the thermoplastic polyurethane resin of Example No. 2 in solution form in preparing a pre-formed sheet according to the present invention.

Example No. 4

The thermoplastic polyurethane of Example No. 2 is dissolved in a solvent consisting of equal amounts of tetrahydrofuran, methylethylketone and xylene in an amount such that a 10 wt % solution of the resin is obtained. This solution is cast onto a film of thermoset polyurethane as described in Example No. 1. The solvent is evaporated with heating and there is obtained a thermoplastic polyurethane film adhered firmly to the underlying thermoset polyurethane film.

With reference to the above examples, it should be noted that the monomers from which the thermoplastic polyurethanes are prepared are selected so that the resulting polymer has a highly amorphous structure, and thus, excellent transparency in addition to the other highly desirable properties discussed in detail below. Amorphous thermoplastic polyurethanes having a combination of highly attractive properties are made in accordance with the present invention by reacting one or more of the following aliphatic diisocyanates: (a) branched chain alicyclic diisocyanates; (b) nonbranched alicyclic diisocyanates; and (c) branched chain noncyclic aliphatic diisocyanates with a branched chain polyester diol or branched chain polyether diol. Groups which form the branched chains include pendant alkyl, aryl, alkaryl, and aralkyl groups. In the case of the polyester diols, the source of the branching is desirably the diol used in preparing the polyester. If the diisocyanates reactant comprise about 85 to 100% of the nonbranched alicyclic type, the polyester diol is prepared from at least two different diols which result in chain branching in the polyester (see Example No. 2 and the use of 2,2-dimethyl-1,3-propanediol and 1,2-propanediol).

With respect to Example No. 3, it can be seen that the amorphous thermoplastic polyurethane can also desirably be made from a polyester diol prepared from at least two different diols, and at least one of which is alicyclic and/or branched, preferably branched. In preparing the polyester diol, mixtures of acid can also be used to impart additional irregularity to the molecular configuration of the polymer, as does the addition of epsilon-caprolactone, similarly mixtures of the isocyanates can also be desirably used.

The amounts of isocyanate and diol used should be such that preferably the NCO/OH ratio is not greater than 1, for example, 0.8 to 0.9. If the ratio is greater than 1, there is a risk that the available NCO groups will react in an uncontrolled manner.

Depending on the particular thermoplastic polymer used, the method by which it is formed into a sheet of the present invention and the particular type laminate in which it is used, various additives may be incorporated into the thermoplastic formulation to improve particular properties. Examples of such additives include adhesion promoters, leveling agents, tackifiers which impart a tackiness to the resinous surface at moderately elevated temperatures (for example, 50°-80° C., and U.V. stabilizers. Examples of such additives are as follows: adhesion promoters—trialkoxy silanes containing 1 to about 4 carbon atoms in the alkoxy groups, such as glycidyl oxypropyl trimethoxy silane, gamma-aminopropyl triethoxy silane, 3,4-expoxycyclohexylethyl trimethoxy silane and aminoethyo trimethoxy silanes; leveling agents—silicon oils, urea-formaldehyde resin solutions, phenolic resins, and cellulose esters; tackifiers—phthalic acid type polyester resins and U.V. stabilizers—benzophenones, salicylates; cyanoacrylates; and benzotriazols.

When used, the additives should be present in amounts which do not adversely affect other desired properties of the thermoplastic polyurethane. Speaking generally, the additives can be used in amounts within the following ranges, in parts by weight based on 100 parts of the thermoplastic polyurethane: about 0.05 to about 2, and preferably about 0.1 to about 0.5 part of adhesion promoter; about 0.1 to about 2 parts of silicon oil, and for other leveling agents, about 0.5 to about 5 parts; about 1 to about 20 parts of a tackifier; and about 0.1 to about 3 parts of a U.V. stabilizer.

In the preparation and use of sheets comprising thermoplastic polyurethanes of the types described in the above examples, improvements in adhesive and leveling properties can be achieved by the use of adhesion promoters and leveling agent of the types mentioned above. Such polyurethane formulations have a combination of properties which make them particularly suitable for use in glazing laminates requiring high optical standards, such as required in windshields. In this regard, films of the polyurethane have excellent transparency and optical properties and are haze-free for extended periods of time and do not bloom. They also have excellent bonding properties to both glass and plastic, including to the anti-lacerative and self-healing thermoset polyurethane, which properties are maintained for long periods of time under varying conditions, including exposure of laminates comprising the sheet to ultra-violet radiation, wide temperature variations (for example, −5° to 150° C., and high humidity (for example, 95% relative humidity up to 50° C.).

In addition, the degree of adhesion between the aforementioned thermoplastic polyurethane and a glass ply is such that when used in a windshield, upon impact, the adhesive bond is strong enough to avoid delamination and yet weak enough to release from the glass to avoid being torn. In this respect, it meets standard requirements.

It is further noted that the elastic properties of the aforementioned thermoplastic polyurethane are such that sheets incorporating them can be formed into rolls without adverse affects on the optical properties of the resinous film. In addition, the plastic deformation properties of the polyurethane are such that such rolls can be unwound without adverse effect on the optical properties of the plastic film.

Another important feature of the aforementioned thermoplastic polyurethanes is that they have a combination of properties which renders them compatible for use with materials conventionally used in commercial windshields and also with anti-lacerative/self-healing thermoset polyurethanes. In this connection, it is noted that aforementioned French Patent No. 2,187,719 discloses that the anti-lacerative/self-healing film has a high capacity for elastic deformation, a low modulus of elasticity (below 2,000 daN/cm$^2$, preferably below 1,200 daN/cm$^2$), and an elongation to rupture in excess of 60% with less than 2% plastic deformation, and preferaby an elongation to rupture in excess of 100 with less than 1% plastic deformation. Highly preferred thermoset polyurethane films of this type, and as described in the aforementioned examples, have a modulus of elasticity of about 25 to about 200 daN/cm$^2$ and an elongation of about 100 to about 200% with less than 1% plastic deformation. In addition to the previously mentioned, highly desired properties possessed by films of the thermoplastic polyurethane described above, it is noteworthy that they also possess properties which are compatible with those properties of the thermoset polyurethane which contribute to their anti-lacerative properties. Thus, the aforementioned thermoplastic polyurethanes have a modulus of elasticity below 2,000 daN/cm$^2$ and an elongation to rupture in excess of 60%. By way of example, it is noted that thermoplastic polyurethanes of the types described in the examples can be made to have a modulus of elasticity of less than 10 daN/cm$^2$ and with an elongation in excess of 750% at 25 daN/cm$^2$.

Another important property of the aforementioned thermoplastic polyurethanes is that sheets incorporating them can be adhered firmly to a glass surface in an autoclave to produce a glazing laminate at temperatures which do not adversely affect the anti-lacerative, self-healing film or other materials conventionally used in laminates, for example, (poly(vinyl butyral). This permits laminates containing such materials and the sheet of the present invention to be readily made utilizing conditions which do not cause a degradation of the properties of the materials. In general, poly(vinyl butyral) and thermoset polyurethane films of the aforementioned type tend to degrade respectively at temperatures within the range of about 135°-140° C. and about 150°-200° C., depending on time of exposure and the specific materials involved. Glazing laminates incorporating the aforementioned thermoplastic polyurethanes can be satisfactorily formed in an autoclave at temperatures below the aforementioned temperatures, for example, at temperatures of about 115° C. Sheets of the type shown in the examples are transparent prior to and after being subjected to the heat and pressure laminating conditions. It is noted also that the cohesive properties of thermoplastic and thermoset materials of said sheets are excellent prior to and after being subjected to autoclaving conditions.

Thus, the amorphous thermoplastic polyurethane is such that at moderately elevated temperatures it is a highly viscous fluid which is capable of well-wetting a surface and flowing into the pores of the surface to thereby provide a good adhesive bond between the sheet and the substrate, and this characteristic is maintained over a wide temperature range. The melting point of the thermoplastic polyurethane is in excess of any temperature likely to be reached in an application in which the sheet of the present invention is used. Thus, the thermoplastic polyurethane advantageously softens or is tacky over a wide temperature range, but does not liquify at temperatures to which a laminate including the sheet is likely to be exposed. Thermoplastic polyurethanes within the scope of the present invention can have a melting range in excess of 200° C.

Still another important property of the thermoplastic polyurethane film is that it functions in a manner such that problems that would otherwise be encountered due to the wide differences in the coefficients of expansion between glass and the thermoset polyurethane are mitigated or avoided. In a laminate in which a film of the thermoset polyurethane is adhered directly to a glass surface or other surface comprising a material which has a coefficient of expansion substantially different than the thermoset polyurethane, defects in the thermoset film are formed as it is subjected to stresses and strains which arise when the laminate is subjected to wide temperature variations. Due to the presence of the thermoplastic layer with its elastic properties and its ability to soften and flow at elevated temperatures, such defects are mitigated or avoided.

It is noted also that elastic properties of the thermoplastic polyurethane contribute to the maintenance of a good adhesive bond between the glass and the sheet at relatively low temperatures. In contrast, in a laminate in which a thermoset film is bonded directly to glass surface, the bond is weakened at lower temperature.

Another aspect of this invention relates to the formation of a continuous film of the thermoplastic polyurethane utilizing selected solvents and evaporation and viscosity control agents which afford the formation of film of high optical quality in a continuous operation.

By way of background, it is noted that when forming a solid thermoplastic polyurethane continuous film on an industrial scale from a liquid film that has been cast onto a moving surface, it is highly advantageous to use or cast a liquid that has good leveling properties, that is, a film of the liquid should assume the desired form of the solid film and a uniform thickness within a short time, for example, within less than one minute and preferably within about 30 seconds or less. To achieve this, the viscosity of the liquid thermoplastic polyurethane at room temperature should be no greater than about 100 cp, and preferably no greater than about 50 to 60 cp. Solvents are added to liquify the normally solid thermoplastic polyurethane, and leveling agents of the type described above can be used to improve the leveling characteristics of the resulting solution.

Pursuant to this invention, the normally solid thermoplastic polyurethane is dissolved in a solvent which has a relatively low boiling point (no greater than about 70° C.), and there is included in this solution an evaporation- and viscosity-control agent (hereafter referred to as "control agent" for convenience) consisting of a material which is a non-solvent for the polyurethane, but which is miscible with said solution, and which has a relatively high boiling point, that is, in excess of about 120° C., and preferably no greater than about 150° C. The solvent and control agent are combined with the thermoplastic polyurethane in amounts such that the resulting solution has the desired viscosity. Such amounts will depend on the particular materials used, including the polyurethane and its molecular weight. The solvent should be used in an amount such that all of the polyurethane is dissolved in the solution.

As to the benefits achieved by use of the solvent/control agent solution described above, it is first noted that developmental work revealed that dissolving thermoplastic polyurethanes of the type to which this invention relates in a low boiling liquid solvent resulted in the formation of a solid film having defects, for example, an orange peel surface, when heat was used to accelerate evaporation of the solvent. It is desirable to use heat to accelerate evaporation of the solvent in order to maintain satisfactory production rates and to ensure that substantially all of the solvent is removed from the polyurethane film. With regard to solvent removal, good solvents for the thermoplastic polyurethanes of the present invention are polar materials having a high degree of affinity for the polyurethane. Solvent not removed from the film can lead to numerous problems during manufacture and use of a laminate comprising a sheet of this invention.

When using a high boiling solvent for the polyurethane, as compared to a low boiling solvent, orange peel surface defects can be avoided, but it is most difficult to remove from the film substantially all of the high boiling solvent. The presence of solvent in the film can lead to the formation of defects such as, for example, bubbles and pinholes during processing of a laminate comprising the film in an autoclave, or when the laminate is subjected to elevated temperatures during use. The presence of solvent can also adversely affect the surface characteristics of the film.

The use of the solvent/control agent solution of the present invention enables the user to formulate a solution having desired leveling and viscosity characteristics while avoiding or mitigating problems of the type described above. Elevated temperatures can be used effectively to remove the low boiling solvent and the high boiling, non-solvent control agent, which is nonpolar and has little or no affinity for the polyurethane, but which permits a controlled evaporation of the low boiling solvent so that surface defects of the orange peel type are avoided.

In preferred form, there is included in the solvent-/control agent solution a material which has a medium boiling point (between about 70° C. and about 120° C. and which is not a solvent for the solid polyurethane, but is capable of swelling it. Such materials which are polar, but less so than the solvent, are miscible with the two other ingredients comprising the solution and aid in further controlling the evaporating characteristics of the solution.

The numerous variables inherent in removing the non-solid portion of the solution make it difficult, if not impossible, to define the proportion of the control agent and medium boiling point materials comprising the solution. Exemplary of such variables are the particular ingredients comprising the solution, the precise boiling points of the non-solids portion of the solution, the elevated temperatures used to evaporate the non-solids portion of the solution, and the time of heating. In view of this, it is recommended that for any particular application, arbitrary amounts be initially selected and adjustments be made as needed if defects of the type described above are encountered. For guideline purposes, it is recommended that equal amounts of the non-solid constituents of the solution be used, and that adjustments be made if necessary.

Suitable materials having the properties mentioned above can be used to prepare the solution. Preferred organic materials are as follows: low boiling solvent—tetrahydrofuran (boiling point of 65° C.); medium boiling material-methylethylketone (boiling point of 80° C.); and high boiling non-solvent-xylene (boiling point of 140° C.).

Solutions of the type described above make it possible to cast the solution as a liquid film which levels prior to evaporation of an amount of solvent that would cause the film to increase in viscosity to the extent that irregularities are set or frozen therein. It should be understood that solutions of the type described can be cast directly onto a moving film of the thermoset material or onto a different type substrate.

In summary, it can be said that the article of the present invention possess a number of highly desirable properties which permit it to be used effectively in a variety of applications. Thus, the sheet can be used as a protective material which contributes to the maintenance of surface integrity on one or both faces [or] *of* rigid or flexible glass or plastic substrates to form glazing laminates of the type mentioned above, and also laminates which can be used as windows or transparencies in the building and transport industries, including, for example, side or lateral windows in motor vehicles, planes and trains. In addition, the sheet can be laminated to a container such as glass and plastic bottles. For many of these applications, the sheet of the present invention can be used effectively with polycarbonates and polyacrylics which are now widely used in many applications. Tinting may be effected before or after the sheet of the present invention is applied.

The sheet of the present invention can also be used to produce a windshield comprising a single glass ply having adhered to the glass surface facing the interior of the vehicle the thermoplastic surface layer of the sheet. In such an embodiment, the thermoplastic surface layer functions also as an energy absorber, and for this purpose it should have a thickness of at least about 5 mm, and preferably not in excess of about 1 mm.

The sheet of the present invention can be modified by joining to the surface of the thermoset material a thermoplastic material, for example, of the type comprising the other surface of the sheet. In this modified form, the sheet can be used as an inter-layer between two glass or plastic plies or between glass and plastic plies which are adhered to the sheet by the thermoplastic layers on each side thereof.

It is believed that the sheet will be widely used to improve vehicle windshields of the type now conventionally used throughout the world. An improved windshield according to the invention will generally comprise an outer glass ply having a thickness of about 1 to about 3 mm, an inter-layer of suitable energy absorbing material such as poly(vinyl butyral) having a thickness of about 0.5 to about 1 mm, an inner glass ply having a thickness of about 0.5 to about 3 mm and adhered thereto, the pre-formed sheet of the present invention comprising a thermoplastic film having a thickness of about 0.02 to about 0.6 mm and a thermoset film of anti-lacerative and self-healing properties having a thickness of about 0.4 to about 0.6 mm. Such safety windshields should function to effectively mitigate injuries of the type normally caused by shattered glass to the face of an individual.

The embodiments of the invention which an exclusive property or privilege is claimed are defined as follows:

What is claimed as new and desired to be secured by Letters Patent of the United States is:

1. A pre-formed polymeric sheet for use in preparing a glazing laminate, consisting essentially of one surface of said sheet comprising an amorphous thermoplastic material capable of adhering to a ply of said laminate and the other surface of said sheet comprising a thermoset material which imparts desired properties to said laminate, said thermoplastic material comprising a thermoplastic polyurethane comprised of the reaction product of (A) one or more of the following aliphatic diisocyanates: (i) a branched chain alicyclic diisocyanate; (ii) a non-branched alicyclic diisocyanate; and (iii) a branched chain noncyclic diisocyanate; and (B) a branched chain polyester diol or branched chain polyether diol or mixture thereof; said diols having a molecular weight of about 500–4000, and wherein when reactant (A) comprises 85 to 100% of said non-branched alicyclic diisocyanate and when reactant (B) comprises said polyester diol, then said polyester diol is prepared from at least two different diols which result in chain branching in said polyester diol.

2. The pre-formed sheet of claim 1, wherein said aliphatic diisocyanate is selected from the group consisting of 1,6-hexanediisocyanate, 2,2,4 and 2,4,4-trimethyl-1,6-hexanediisocyanate, 1,3-bis-(isocyanatomethyl)benzene, bis(4-isocyanatocyclohexyl)methane, bis(3-methyl-4-isocyanatocyclohexyl)methane, 2,2-bis (4-isocyanatocyclohexyl)propane and 3-isocyanatomethyl-3,5,5-trimethylcyclohexylisocyanate, said polyether diol is a diol prepared from polyethers elected from the group consisting of ethylene oxide, 1,2-propylene oxide and tetrahydrofuran, and said polyester diol is a diol prepared from a diacid selected from the group consisting of malonic acid, succinic acid, glutaric acid, adipic acid, suberic acid and sebacic acid.

3. The pre-formed sheet of claim 1, wherein said thermoplastic polyurethane is prepared from a polyester comprising the reaction product of a polyol component prepared from the reaction product of adipic acid, 1,6-hexanediol, 2,2-dimethyl-1,3-propanediol and 1,2-propanediol and an isocyanate component comprising bis(4-isocyanatocyclohexyl)methane.

4. The pre-formed sheet of claim 1, wherein said thermoplastic polyurethane is prepared from molecules of substantially linear chains, with limited cross-linking, and said thermoset sheet is a thermosetting polyurethane with a high degree of cross-linking.

*5. A coated transparent article comprising:*

*a) a rigid transparent substrate;*

*b) a transparent energy-absorbing elastomeric sheet, one surface of which is bonded to said rigid substrate; and*

*c) coated on the other surface of said elastomeric sheet, an abrasion-resistant branched polyurethane which is the reaction product of:*

*(1) an aliphatic polyisocyanate and*

*(2) a polyol selected from the group consisting of polyether and polyester polyols having a molecular weight within the range of 450–4,000,*

*wherein at least one of said polyisocyanate and said polyol has a functionality greater than 2.*

*6. The coated article of claim 5, wherein said rigid transparent substrate is glass.*

*7. The coated article of claim 5, wherein said transparent energy-absorbing elastomeric sheet is comprised of polyurethane.*

*8. The article of claim 5, wherein said abrasion-resistant branched polyurethane is the reaction product of a branched polyisocyanate and a polyester polyol.*

*9. The article of claim 8, wherein said polyester polyol is obtained by the reaction of a polyfunctional alcohol and an aliphatic diacid.*

*10. The article of claim 5, wherein said polyol comprises the condensation product of propylene oxide with 2,2-bis(-hydroxymethyl)-1-butanol.*

*11. The product of claim 8, wherein said polyisocyanate is bis (4-isocyanatocyclohexyl)methane.*

* * * * *